A. J. SWEETLAND.
Pipe-Coupling or Leak-Stopper.

No. 208,547.　　　　　　Patented Oct. 1, 1878.

Witnesses.
S. N. Piper
C. F. Daniels

Inventor
Adoniram J. Sweetland,
by his attorney.
R. H. Eddy

UNITED STATES PATENT OFFICE.

ADONIRAM J. SWEETLAND, OF BOSTON, MASSACHUSETTS.

IMPROVEMENT IN PIPE-COUPLINGS OR LEAK-STOPPERS.

Specification forming part of Letters Patent No. 208,547, dated October 1, 1878; application filed September 12, 1878.

*To all whom it may concern:*

Be it known that I, ADONIRAM J. SWEETLAND, of Boston, in the county of Suffolk and State of Massachusetts, have invented a new and useful Pipe-Coupling and Leak-Stopper; and do hereby declare the same to be described in the following specification and represented in the accompanying drawings, of which—

Figure 1:
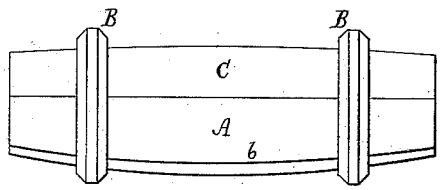
Figure 2:
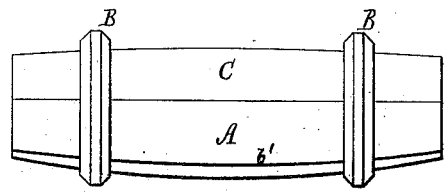
Figure 3:
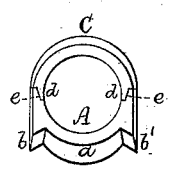
Figure 4:
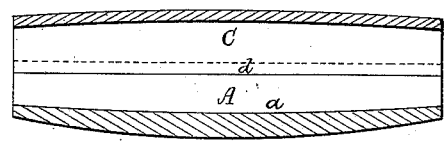
Figure 5:
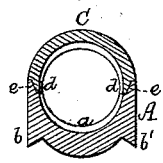
Figure 6:
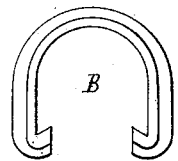

Figures 1 and 2 are opposite side elevations, Fig. 3 an end view, Fig. 4 a longitudinal section, and Fig. 5 a transverse section, of it. Fig. 6 is a side view of one of its clamps.

My invention has reference to the kind of pipe-leak stoppers described in the United States Patent No. 92,338; and consists in the combination of an auxiliary tubular segment or cap with the main tubular segment, its flanges or pairs of inclined planes, and clamps, all being as hereinafter explained.

My invention is designed not only to answer all the purposes of the other, but to better strengthen a pipe where it may be weakened by a break or weak place, causing a leak. It also answers as a coupling to two pipes, especially those made of lead or soft metal.

In the drawings, A denotes the saddle; B B, the clamps, and C the auxiliary saddle or cap.

The saddle A is composed of the semicircular segment $a$ of a tube and two angular or curved shoulders or flanges, $b$ $b'$, projecting from opposite sides of it or disposed on its flanks and formed in manner as represented. On the said tube segment $a$ is another, or a cap, C, which is usually beveled at its lower edges, as shown at $d$ $d$, to fit into corresponding grooves $e$ $e$ made in the part A. The said cap I prefer to curve lengthwise of it on its top, in manner as shown, although it may be semi-cylindrical or be straight on top from end to end.

Each of the two clamps B B is formed to encompass the cap C and extend down the sides of the saddle or part A and hook upon its opposite flanges, as shown.

On applying the part A to a pipe so that the leaky portion thereof may rest in such part A or come directly underneath and in the cap C, when the latter is in place, and applying the clamps to the parts A and C, and driving such clamps toward each other, both parts A and C may be firmly clamped together and upon the pipe, and in case of a cement or a proper packing being first laid on the pipe at the leak, or in parts A and C, such cement or packing may be held firmly in place against the pipe by the said parts A and C and the clamps B B.

I do not herein claim a pipe-leak stopper composed of a single tubular segment and flanges and clamps formed and arranged as represented in the aforesaid patent.

What I claim as my invention is—

The combination of the tubular segment or cap C with the two clamps B B and the saddle or tubular segment A and its curved or double-inclined flanges $b$ $b'$, arranged on its flanks, all being substantially and to operate as and for the purpose or purposes as set forth.

ADONIRAM J. SWEETLAND.

Witnesses:
R. H. EDDY,
S. N. PIPER.